United States Patent Office 2,774,779
Patented Dec. 18, 1956

2,774,779
METHOD OF PREPARING PHENYLHALOSILANES

John W. Gilkey, Midland, Mich., assignor to Dow Corning Corporation, Midland, Mich., a corporation of Michigan No Drawing. Application May 27, 1953,
Serial No. 357,921

3 Claims. (Cl. 260—448.2)

This invention relates to a method of preparing monomeric phenylhalosilanes.

The primary commercial method for preparing monomeric phenylhalosilanes is the reaction of hydrogen-containing silanes (such as trichlorosilane and methyldichlorosilane) with benzene. During this reaction there is formed a residue consisting primarily of materials in which the silicon atoms are linked through phenylene radicals. This residue usually amounts to from 5 to 10 percent of the total reaction product. Since monomeric phenylchlorosilanes are in high demand for the formation of many organopolysiloxane products, a considerable quantity of this residue accumulates. To date, there has been no substantial use for the by-product. Consequently, it represents a rather expensive material which is substantially a complete waste. Applicant has found a way of substantially eliminating this residue.

It is the object of this invention to provide a novel method for converting the residue formed during the production of phenylchlorosilanes into monomeric phenylhalosilanes which are of commercial importance. Another object is to decrease the cost of production of phenylhalosilanes. Other objects and advantages will be apparent from the following description.

This invention relates to a process of preparing monomeric phenylsilanes which comprises heating a silcarbane in which the silicon atoms are connected by phenylene links, the remaining valences of the silicon being satisfied by a radical of the group halogen atoms and monovalent hydrocarbon radicals, with benzene in the presence of boron and aluminum halides at a temperature of from 150 to 450° C.

The primary reaction involved in the process of this invention is the splitting of a phenylene link between two silicon atoms, thereby producing monomeric phenylhalosilanes (i. e. silanes containing only one silicon atom). The reaction may be represented schematically as follows:

$$\equiv SiC_6H_4Si\equiv\ +C_6H_6 \rightarrow 2\equiv SiC_6H_5$$

This reaction proceeds whenever a mixture of a silane having phenylene links is heated with benzene in the presence of the defined catalyst at a temperature of from 150 to 450° C. The amount of benzene is not critical although, as can be seen from the equation, the stoichiometric amount of benzene is one molecule of the latter per phenylene link in the silane reactant. At times it may be desirable to employ an excess of benzene since this tends to retard phenyl cleavage, that is, the formation of benzene by cleavage of a phenyl radical from the silicon.

The reaction of this invention may be carried out at any pressure but preferably superatmospheric pressures are employed.

The phenylene linked silanes employed in this invention may be represented generally by the formulae

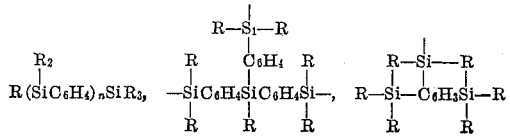

For the purpose of this invention, R can be any monovalent hydrocarbon radical such as, for example, phenyl, xenyl, tolyl, methyl, ethyl, octadecyl, vinyl, hexenyl, cyclohexyl or cyclohexenyl or R can be a halogen atom. The silanes may vary from dimeric materials containing only two silicon atoms to exceedingly complex crosslinked polymers resembling asphalt in appearance. As has been mentioned above, these materials are formed as a by-product in the commercial preparation of phenylhalosilanes. However, they may also be produced by a Wurtz reaction between halophenylsilanes (for example $ClC_6H_4SiCl_3$) and chlorosilanes in the presence of an alkali metal.

The products obtained by reacting the phenylene linked silanes vary with the type of R groups. Thus in those cases where all of the R groups are halogen, the product is a phenyltrihalosilane. If some of the R groups are phenyl and the remainder halogen, then the product is a mixture of phenyltrihalosilanes and diphenyldihalosilanes. If some of the R groups are other hydrocarbon radicals such as methyl, vinyl or cyclohexyl, then the product will contain phenylmethyl, phenylvinyl and phenylcyclohexylsilanes respectively.

The catalysts may be employed in any amount, however, the preferred range is from .5 to 5 percent by weight based upon the weight of the reaction mixture. The catalysts may be employed singularly or in combination. Aluminum halides are more effective than the boron halides. In those cases where aluminum halides are employed, it is preferable to remove them from the reaction mixture prior to distillation since they tend to decompose the phenylhalosilane products. The most effective way of removing aluminum halides is by adding an equimolar amount of sodium chloride whereupon the aluminum precipitates in the form of a complex of sodium chloride and aluminum halide. This can then be removed either by decanting or filtering the mixture.

The phenylhalosilanes produced by the method of this invention are useful in the preparation of the well-known commercially important phenylpolysiloxanes.

The following examples are illustrative only and should not be construed as limiting the invention which is properly delineated in the appended claims.

Example 1

829 g. of $Cl_3SiC_6H_4SiCl_3$, 187 g. of benzene and 11 g. of borontrichloride were heated in a bomb for 16 hours at 296 to 303° C. The maximum pressure during the reaction was 222 p. s. i. Upon distillation of the product, 609 g. of the above silane and 161 g. of benzene were recovered together with 89.9 g. of produced phenyltrichlorosilane.

Example 2

632 g. of $Cl_3SiC_6H_4SiCl_3$, 234 g. of benzene and 43 g. of aluminum chloride were heated in a bomb 32 hours at 175 to 185° C. The product was placed in a still and 20 g. of sodium chloride were added. The product was distilled to remove 26 g. of silicon tetrachloride and 181 g. of benzene. The residue was decanted from the precipitated aluminum - chloride - sodium - chloride complex and distillation was continued to give 194.8 g. of phenyltrichlorosilane. This represents at 31 percent yield based upon the $Cl_3SiC_6H_4SiCl_3$ employed.

Example 3

773 g. of $C_6H_5(Cl_2)SiC_6H_4SiCl_3$, 312 g. of benzene and 54 g. of aluminum chloride were heated in a bomb 16 hours at 200° C. The reaction product was found by infrared analysis to contain 352 g. of phenyltrichlorosilane and 254 g. of diphenyldichlorosilane which represents a yield of 78.5 percent of total phenylchlorosilanes based upon the weight of the starting silane.

Example 4

350 g. of a complex mixture of phenylene linked silanes in the form of a tarry residue obtained from the reaction of benzene with trichlorosilane in the presence of boron chloride, 312 g. of benzene and 33 g. of aluminum chloride were heated 16 hours at 200–210° C. in a bomb. An infrared analysis of the resulting product showed it to contain 99 g. of phenyltrichlorosilane and 158 g. of diphenyldichlorosilane representing a 73 percent yield of the total phenylchlorosilanes based upon the weight of the starting residue.

Example 5

350 g. of the residue of Example 4, 312 g. of benzene and 7 g. of boron trichloride were heated in a bomb at a temperature of from 197 to 209° C. for 16 hours. An infrared analysis of the reaction product showed it to contain 8.4 percent by weight phenyltrichlorosilane, 11.5 percent by weight diphenyldichlorosilane and 1.6 percent by weight phenyldichlorosilane.

That which is claimed is:

1. A process of preparing monomeric phenylsilanes which comprises heating a silcarbane in which the silicon atoms are connected by phenylene links, the remaining valences of the silicon being satisfied by a radical selected from the group consisting of halogen atoms and monovalent hydrocarbon radicals, with benzene in the presence of a catalyst of the group consisting of boron and aluminum halides, at a temperature of from 150 to 450° C., in a closed system.

2. A process of preparing monomeric phenylchlorosilanes which comprises heating a silane in which the silicon atoms are connected by phenylene links, the remaining valences of the silicon being satisfied by chlorine atoms and phenyl radicals, with benzene in the presence of a catalyst of the group consisting of boron and aluminum halides, at a temperature of from 150 to 450° C., in a closed system.

3. A process of preparing monomeric phenylchlorosilanes which comprises heating a silane in which the silicon atoms are connected by phenylene links, the remaining valences on the silicon being satisfied by chlorine atoms, with benzene in the presence of a catalyst of the group consisting of boron and aluminum halides, at a temperature of from 150 to 450° C., in a closed system.

References Cited in the file of this patent
UNITED STATES PATENTS
2,577,782    Clark ------------------ June 19, 1951